United States Patent
Pichler

(10) Patent No.: US 11,725,610 B2
(45) Date of Patent: Aug. 15, 2023

(54) METHOD AND DEVICE FOR OPERATING A FUEL EVAPORATION RETENTION SYSTEM OF AN INTERNAL COMBUSTION ENGINE

(71) Applicant: Vitesco Technologies GmbH, Regensburg (DE)

(72) Inventor: Thomas Pichler, Munich (DE)

(73) Assignee: VITESCO TECHNOLOGIES GMBH, Hanover (DE)

(*) Notice: Subject to any disclaimer, the term of this patent is extended or adjusted under 35 U.S.C. 154(b) by 0 days.

(21) Appl. No.: 17/629,064

(22) PCT Filed: Jul. 22, 2020

(86) PCT No.: PCT/EP2020/070676
§ 371 (c)(1),
(2) Date: Jan. 21, 2022

(87) PCT Pub. No.: WO2021/013887
PCT Pub. Date: Jan. 28, 2021

(65) Prior Publication Data
US 2022/0275775 A1    Sep. 1, 2022

(30) Foreign Application Priority Data
Jul. 23, 2019    (DE) .................... 10 2019 210 900.4

(51) Int. Cl.
*F02M 25/08* (2006.01)
(52) U.S. Cl.
CPC ..... *F02M 25/0809* (2013.01); *F02M 25/0836* (2013.01); *F02M 25/0854* (2013.01)
(58) Field of Classification Search
CPC .................. F02M 25/0809; F02D 2041/225
See application file for complete search history.

(56) References Cited

U.S. PATENT DOCUMENTS

| 6,321,727 B1* | 11/2001 | Reddy | ............... F02M 25/0809 123/520 |
| 2006/0144370 A1* | 7/2006 | Iihoshi | ............... F02M 25/0809 123/491 |

(Continued)

FOREIGN PATENT DOCUMENTS

EP    3 409 936    12/2018    ............ F02M 25/08

OTHER PUBLICATIONS

Search Report for International Application No. PCT/EP2020/070676, 16 pages.

*Primary Examiner* — Logan M Kraft
*Assistant Examiner* — Anthony L Bacon
(74) *Attorney, Agent, or Firm* — Slayden Grubert Beard PLLC

(57) ABSTRACT

Various embodiments include a method for operating a fuel evaporation retention system of a vehicle with an internal combustion engine. It includes measuring a pressure change resulting from a temperature change of a gas volume in the fuel tank over a defined period of time while the vehicle is at a standstill after the engine controller has been switched off and comparing an expected pressure profile based on a given temperature profile based at least in part on the tank fill level and after the engine controller has been switched on to an actual measured pressure profile from a previous vehicle standstill phase. If the measured pressure profile lies within a settable tolerance around the expected pressure profile, the method confirms a leak-tight fuel tank. If the measured pressure profile lies outside the settable tolerance, the method identifies a faulty fuel tank and displaying an alert.

14 Claims, 3 Drawing Sheets

(56) References Cited

U.S. PATENT DOCUMENTS

| | | | |
|---|---|---|---|
| 2013/0074583 A1 | 3/2013 | Perry | ............................. 73/40.7 |
| 2015/0219522 A1* | 8/2015 | Tseng | ................. F02M 25/0809 |
| | | | 73/49.3 |
| 2016/0025589 A1* | 1/2016 | Tseng | .................... G01M 3/025 |
| | | | 73/40.5 R |
| 2017/0241376 A1* | 8/2017 | Dudar | ................ F02M 25/0809 |
| 2019/0017453 A1* | 1/2019 | Dudar | .................... G06N 5/046 |
| 2020/0332747 A1* | 10/2020 | Muto | ................ F02M 25/0872 |

* cited by examiner

ECU: Consuming control unit
PT: Pressure temperature sensor

ECU: Consuming control unit
PT: Pressure temperature sensor
EC: Additional electronics

METHOD AND DEVICE FOR OPERATING A FUEL EVAPORATION RETENTION SYSTEM OF AN INTERNAL COMBUSTION ENGINE

CROSS-REFERENCE TO RELATED APPLICATIONS

This application is a U.S. National Stage Application of International Application No. PCT/EP2020/070676 filed Jul. 22, 2020, which designates the United States of America, and claims priority to DE Application No. 10 2019 210 900.4 filed Jul. 23, 2019, the contents of which are hereby incorporated by reference in their entirety.

TECHNICAL FIELD

The present disclosure relates to internal combustion engines. Various embodiments of the teachings herein may include methods and/or devices for diagnosing a fuel evaporation retention system of an internal combustion engine.

BACKGROUND

In order to limit pollutant emissions, modern motor vehicles which are driven by an internal combustion engine are equipped with fuel evaporation retention systems, normally referred to as tank ventilation devices. The purpose of such devices is to accommodate and temporarily store fuel vapor that forms in a fuel tank as a result of evaporation, such that the fuel vapor does not escape into the environment.

As a store for the fuel vapor, a fuel vapor retention filter, which uses for example activated carbon as a storage medium, is provided in the fuel evaporation retention system. The fuel vapor retention filter has only a limited storage capacity for fuel vapor. In order to be able to use the fuel vapor retention filter over a long period of time, it must be regenerated. For this purpose, a controllable tank ventilation valve is arranged in a line between the fuel vapor retention filter and an intake pipe of the internal combustion engine, which valve is opened for executing the regeneration, such that on the one hand the fuel vapors adsorbed in the fuel vapor retention filter escape into the intake pipe owing to the negative pressure in the latter, and thus are fed into the intake air of the internal combustion engine and thus to the combustion process, and on the other hand the storage capacity of the fuel vapor retention filter for fuel vapor is restored.

As an example, FIG. 1 shows a tank system equipped with a leak diagnosis unit at the fresh-air inlet of the activated carbon filter. The tank system shown in FIG. 1 has inter alia the following components: a fuel tank 1; a tank shut-off valve 2, by means of which the hydrocarbon vapors generated in the fuel tank 1 can be retained in the tank in order to subsequently be fed in a controlled manner under suitable operating conditions to an activated carbon filter 9; a tank ventilation valve 3, which may be configured as a switching or linear valve and which is actuated by an engine controller 4 in order to control the gas flow from the activated carbon filter 9 to an air path 5 of the internal combustion engine; a tank ventilation line 6 (tank region) between the fuel tank 1 and the tank shut-off valve 2; the activated carbon filter 9, in which hydrocarbons outgassed from the fuel tank 1 are bound; a tank ventilation line 7 (filter region), via which the hydrocarbon gases are conducted from the fuel tank 1 into the activated carbon filter 9 and onward to the tank ventilation valve 3; a tank ventilation line 8 (engine region), via which the hydrocarbon gases are introduced downstream of the tank ventilation valve 3 from the activated carbon filter 9 into the air path 5 of the internal combustion engine; a pressure sensor 10 in the tank ventilation line 7 (filter region) between the activated carbon filter 9 and the tank ventilation valve 3; a pressure sensor and a temperature sensor in the fuel tank 1 or a combined pressure/temperature sensor 11; and an engine controller 4.

The engine controller may be programmed to determine: for the present operating state, a setpoint value for the purge flow from the activated carbon filter 9 to the air path of the internal combustion engine, and an intake pipe pressure in the intake tract by means of a pressure sensor. The engine controller 4 may then read in the values of the pressure and temperature sensor system, and determine, from the pressure gradient between the fresh-air filter 13 of the activated carbon filter 9 and the pressure at the introduction point into the air path 5 of the internal combustion engine from the specified purge flow, a PWM value for the actuation of the tank ventilation valve 3. The engine controller may further calculate the fuel quantity to be injected for the present operating state of the internal combustion engine.

According to various country-specific legal regulations or for safety reasons, it is necessary to ensure or diagnose the functionality of the fuel tank ventilation system including the fuel tank. Specifically, it is necessary to check the entire fuel evaporation system including the fuel tank as far as the tank ventilation valve (see tank region 23 and filter region 24 in FIG. 1) for leak-tightness. There are different legal requirements here with regard to the smallest leak diameter to be diagnosed.

Furthermore, the continuity of the tank ventilation lines downstream of the tank ventilation valve and the maintenance of the mass flow between the activated carbon filter and the introduction point of the tank ventilation gas into the air path of the internal combustion engine must be ensured. This includes a check of the functionality of the tank ventilation valve.

The leak-tightness check of the fuel evaporation system demanded by various legislators exclusively for the tank region and the filter region is performed, for the known system illustrated in FIG. 1, with or if appropriate also without a tank shut-off valve through the use of leak diagnosis pumps (leak diagnosis unit 12; see FIG. 1). This leak diagnosis unit 12 pressurizes the fuel evaporation system, or generates a vacuum, after a defined time interval after the internal combustion engine has been switched off (vehicle standstill). Subsequently, depending on the embodiment, the resulting pressure profile or the electrical power consumed by the leak diagnosis unit is then used as an evaluation criterion for determining a leak diameter. However, such a procedure is time-consuming, causes additional energy consumption for the actuation of the pumps, and generates noise emissions while the vehicle is at a standstill.

SUMMARY

The teachings of the present disclosure may be used in a method for diagnosing a fuel evaporation retention system of an internal combustion engine wherein: a pressure change resulting from a temperature change of a gas volume in the fuel tank in the case of a constant tank volume and over a defined period of time while the vehicle is at a standstill after the internal combustion engine has been shut down is used for the purposes of checking the leak-tightness of a tank region of the fuel evaporation retention system, a pressure profile expected from a given temperature profile during cooling or warming of the fuel tank is compared, in a manner dependent on the tank fill level and after terminal 15 of the internal combustion engine has been switched on, with an actually measured pressure profile from a previous vehicle standstill phase, and if the measured pressure profile lies within a settable corridor around the expected pressure profile, it is identified that a leak-tight tank is present.

As another example, some embodiments may include a method for diagnosing a fuel evaporation retention system of an internal combustion engine which has an engine controller and a pressure and temperature sensor system, in which method: a pressure change resulting from a temperature change of a gas volume in the fuel tank in the case of a constant tank volume and over a defined period of time while the vehicle is at a standstill after the engine controller has been switched off is used for the purposes of checking the leak-tightness of a tank region of the fuel evaporation retention system, a pressure profile expected from a given temperature profile during cooling or warming of the fuel tank is compared, in a manner dependent on the tank fill level and after the engine controller has been switched on, with an actually measured pressure profile from a previous vehicle standstill phase, and if the measured pressure profile lies within a settable corridor around the expected pressure profile, it is identified that a leak-tight tank is present.

In some embodiments, correlating temperature and pressure profiles are stored in the engine controller in characteristic maps.

In some embodiments, after a settable waiting time after the engine controller has been switched off and while the vehicle is at a standstill, measured value pairs of tank temperature and tank pressure are determined at settable time intervals by means of the pressure and temperature sensors.

In some embodiments, the measured value pairs formed while the vehicle is at a standstill are stored in a measurement data electronics unit (33).

In some embodiments, the measured value pairs stored in the measurement data electronics unit (33) while the vehicle is at a standstill are transmitted to the engine controller after the engine controller has been switched on.

As another example, some embodiments include a device for diagnosing a fuel evaporation retention system of an internal combustion engine which has an engine controller and a pressure and temperature sensor system, which internal combustion engine furthermore has a measurement data electronics unit (33) designed to store measured value pairs at predetermined time intervals while the engine controller (4) is switched off and the vehicle is at a standstill, which measured value pairs each comprise a measured pressure value and a measured temperature value, and to transmit the measured value pairs stored while the engine controller was switched off to the engine controller after the engine controller (4) has been switched on.

In some embodiments, the fuel evaporation retention system has a tank region (23) which includes a fuel tank (1), a tank ventilation line (6), a pressure sensor (11) and a temperature sensor (11), wherein the pressure sensor and the temperature sensor form the pressure and temperature sensor system.

In some embodiments, the pressure sensor and the temperature sensor are configured in the form of a combined pressure and temperature sensor (11).

In some embodiments, the measurement data electronics unit (33) is integrated into the housing of the combined pressure and temperature sensor (11).

In some embodiments, the measurement data electronics unit (33) is configured as an independent component.

In some embodiments, the measurement data electronics unit (33) is connected to the engine controller (4) via a communication line (30, 32).

In some embodiments, the measurement data electronics unit (33) is connected to a voltage source (22) via a voltage supply line (29).

In some embodiments, the voltage source (22) is terminal 30 of the internal combustion engine or is a button cell.

In some embodiments, the measurement data electronics unit (33) is furthermore configured to transmit presently determined measured pressure and temperature values to the engine controller while the engine controller is switched on.

BRIEF DESCRIPTION OF THE DRAWINGS

The invention will be explained below by way of example with reference to the figures. In the figures.

DETAILED DESCRIPTION

Figure 1:
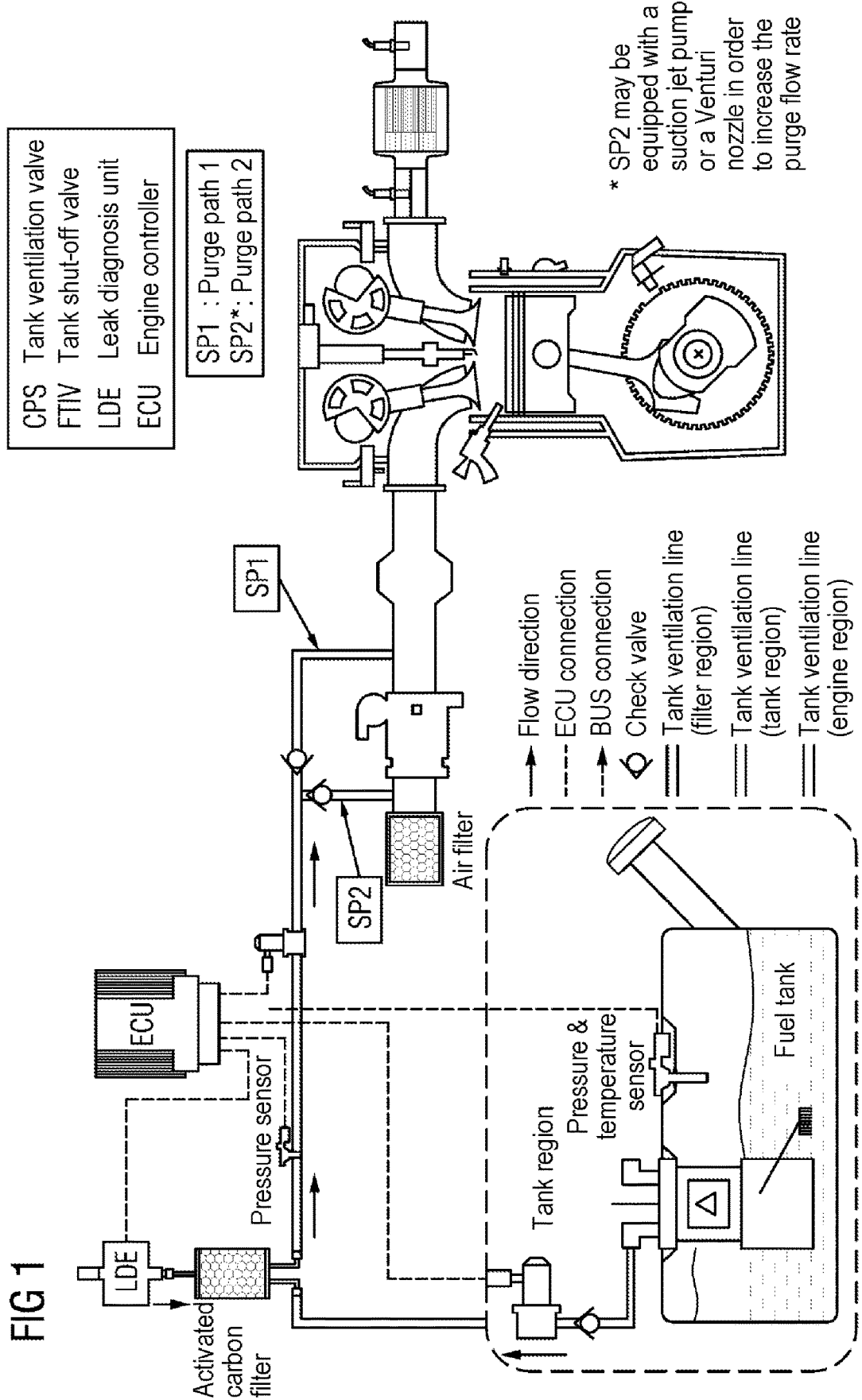
FIG. 1 is a schematic illustration of a known fuel evaporation retention system of an internal combustion engine.
Figure 2:
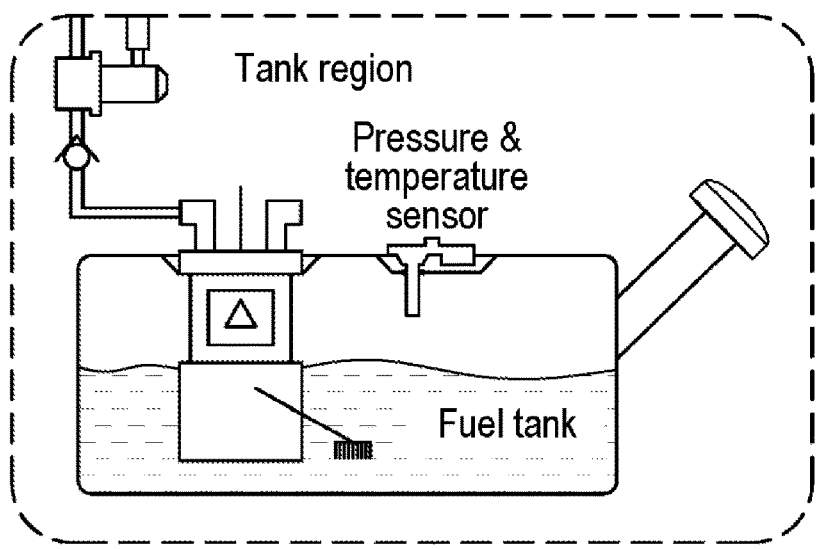
FIG. 2 shows a tank region of a fuel evaporation retention system.

For the following explanation of example methods for leak diagnosis of the fuel evaporation system incorporating teachings of the present disclosure, the tank region 23 illustrated in FIG. 2, which has a closed tank volume, will be considered as an example. The diagnostic principle explained below can be applied to all volumes which are formed in a manner dependent on tank shut-off and/or throttle components and which have system-related pressure differences or pressure thresholds (for example pressure relief valves, check valves, . . . ) in relation to the ambient pressure level.

A pressure change resulting from a temperature change of the gas volume in the fuel tank 1 in the case of a constant tank volume and over a defined period of time while the vehicle is at a standstill after the internal combustion engine has been shut down is used for the purposes of checking the leak-tightness of the tank region 23 illustrated in FIG. 2, which includes a fuel tank 1, a tank shut-off valve 2, a tank ventilation line (tank region) 6, a combined pressure and temperature sensor 11, and a check valve 14. Here, a pressure profile expected from a given temperature profile during the cooling or the warming of the fuel tank is compared, in a manner dependent on the tank fill level and after the engine controller has been switched on or after terminal 15 (ignition terminal) has been switched on, with an actually measured pressure profile from the previous vehicle standstill phase.

If the measured pressure profile lies within a settable band around the expected pressure profile, then it is identified that a leak-tight fuel tank is present. Given correlating temperature and pressure profiles, which have been determined empirically in advance, are stored in engine controller 4 in characteristic maps. In order to be able to represent the described temperature and pressure profile, after a settable waiting time after the internal combustion engine has been shut down and while the vehicle is at a standstill, measured value pairs of the tank temperature and the tank pressure are formed at settable time intervals.

The process of acquiring the value pairs will be presented by way of example below on the basis of FIG. 3 for a cooling process. The terminal 15 signal, the pressure and the temperature are plotted upward in FIG. 3. The time t is plotted to the right. The time interval 26 is the acquisition period. The reference numeral 27 illustrates the acquisition times that lie within the acquisition period. The letter T illustrates a waiting time, the reference numeral 28 illustrates the point in time of the evaluation of the measured value pairs, the course K1 illustrates the course of the pressure in the presence of a leak, and the course K2 illustrates the course of the pressure in the presence of a leak-tight system.

Figure 3:
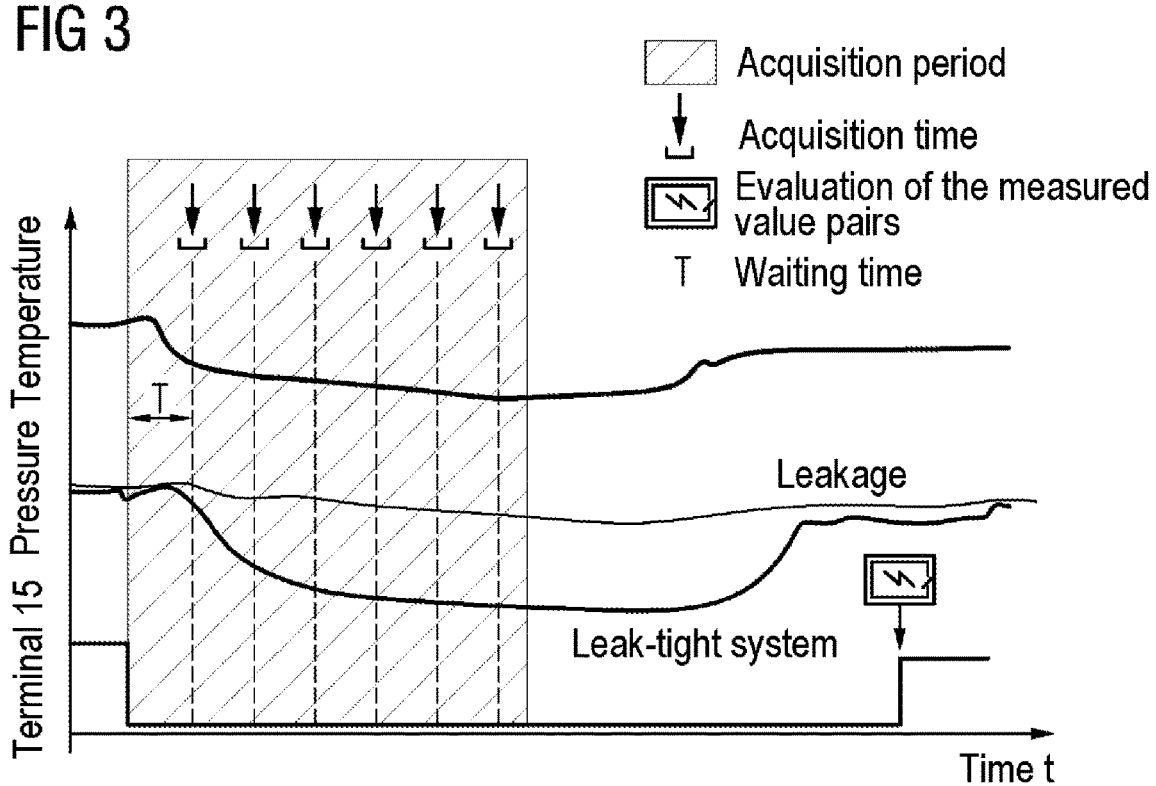
FIG. 3 shows a diagram of pressure and temperature profiles in the diagnosis of the fuel evaporation retention system.

The measurement sensor system required to acquire the pressure profile illustrated in FIG. 3 and the temperature profile illustrated in FIG. 3 has a combined pressure and temperature sensor 11 which, using a measurement data electronics unit 33 provided for acquiring and storing measurement data, is capable of communicating with control units, for example engine control units. This measurement data electronics unit 33 is either integrated into the housing of the pressure and temperature sensor 11 or implemented in the form of a separate component.

Figure 4:
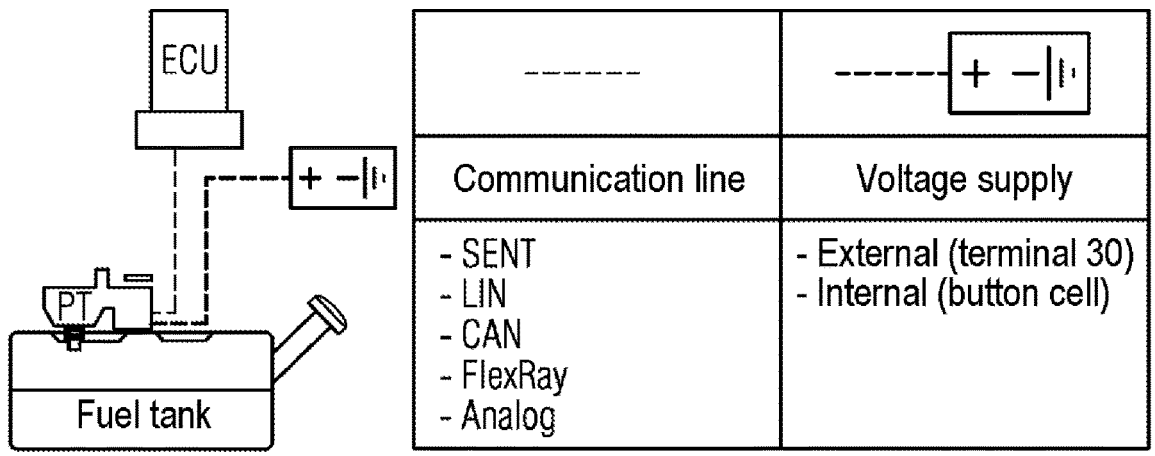
FIG. 4 shows a block diagram for explaining a first embodiment of a measurement data electronics unit incorporating teachings of the present disclosure.

FIG. 4 shows a block diagram of an exemplary embodiment in which the aforementioned measurement data electronics unit is integrated into the housing of the pressure and temperature sensor 11a. In this embodiment, the pressure and temperature sensor 11a and thus also the measurement data electronics unit are connected to a voltage source 22 via a voltage supply line 29. This voltage source 22 is an internal voltage source implemented in the form of a button cell or is an external voltage source, for example terminal 30 of the respective motor vehicle. Furthermore, in this embodiment, the pressure and temperature sensor 11a is connected to the engine controller 4 via a communication line 30. This communication line 30 may be a SENT line, a LIN bus, a CAN bus, a FlexRay line or an analog data line.

Figure 5:
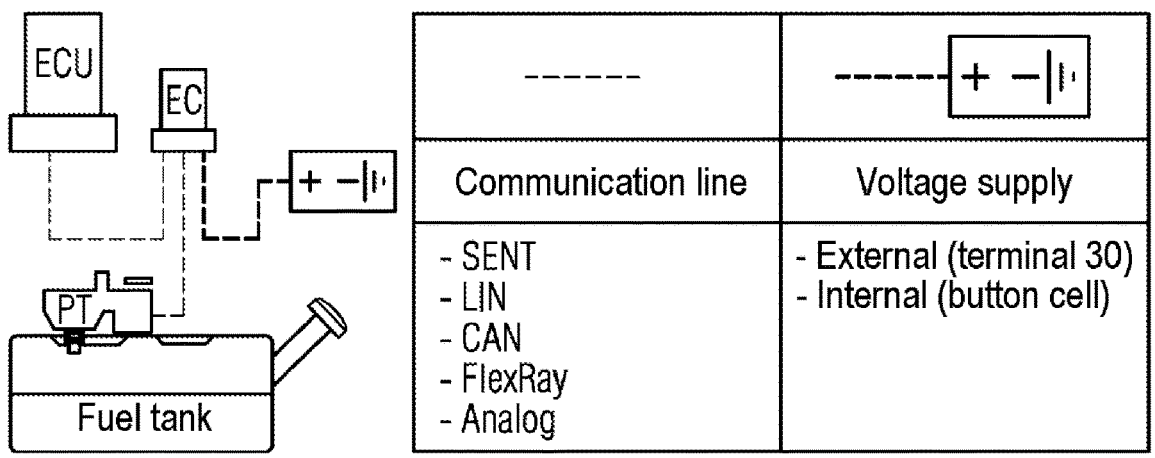
FIG. 5 shows a block diagram for explaining a second embodiment of a measurement data electronics unit incorporating teachings of the present disclosure.

FIG. 5 shows a block diagram of another exemplary embodiment for the evaluation of measured value pairs, in the case of which the measured data electronics unit is implemented in the form of a separate component 33. In this embodiment, the pressure and temperature sensor 11 is connected to the measurement data electronics unit 33 via a first communication line 31. The measurement data electronics unit 33 is furthermore connected to the engine controller 4 via a second communication line 32. Furthermore, the measurement data electronics unit 33 is connected to a voltage source 22 via a voltage supply line 29. This voltage source 22 is an internal voltage source implemented in the form of a button cell or is an external voltage source, for example terminal 30 of the respective motor vehicle. These communication lines 31 and 32 may each be a SENT line, a LIN bus, a CAN bus, a FlexRay line or an analog data line.

The measurement data electronics unit 33 described above is configured to ensure the following functions:
a transmission of the present measured pressure and temperature values to the engine controller while the engine controller is switched on during voltage-supplied operation;
non-volatile storage of measured value pairs recorded at settable time intervals while the vehicle is at a standstill with the engine controller switched off, which measured value pairs each contain a measured pressure value and a measured temperature value;
a transmission of the measured value pairs recorded at settable time intervals while the vehicle is at a standstill to the engine controller after the latter has been switched on.

The abovementioned technical features according to the invention result in the following advantages:
an elimination of the need for diagnostic pumps leads to a reduction in system costs and energy consumption;
by contrast to other known diagnostic methods, it is possible to evaluate a temperature increase in the fuel tank in order to determine a leak in the tank region while the vehicle is at a standstill;
there is no need for an active control of actuators while the vehicle is at a standstill, whereby noise emissions are prevented.

What is claimed is:

1. A method for operating a fuel evaporation retention system of a vehicle with an internal combustion engine which has an engine controller and a fuel tank, the method comprising:
measuring a pressure change resulting from a temperature change of a gas volume in the fuel tank with a constant tank volume over a defined period of time while the vehicle is at a standstill after the engine controller has been switched off;
storing the measure pressure change in a measurement data electronics unit for acquiring and storing measurement, the measurement data electronics unit in communication with the engine controller;
transmitting the measured pressure change stored in the measurement data electronics unit to the engine controller after the engine controller has been switched on;
comparing the measured pressure change to an expected pressure profile based on a given temperature profile during cooling or warming of the fuel tank based at least in part on the tank fill level and after the engine controller has been switched on, the expected pressure profile based on an actual measured pressure profile from a previous vehicle standstill phase; and
if the measured pressure profile lies within a settable tolerance around the expected pressure profile, confirming a leak-tight fuel tank; and
if the measured pressure profile lies outside the settable tolerance, identifying a faulty fuel tank and displaying an alert to a user of the vehicle.

2. The method as claimed in claim 1, wherein correlating temperature and pressure profiles are stored in the engine controller in characteristic maps.

3. The method as claimed in claim 1, further comprising, after a settable waiting time after the engine controller has been switched off and while the vehicle is at a standstill, measuring value pairs of tank temperature and tank pressure at settable time intervals.

4. The method as claimed in claim 3, further comprising storing the measured value pairs formed while the vehicle is at a standstill are stored in a measurement data electronics unit.

5. The method as claimed in claim 4, further comprising transmitting the measured value pairs stored in the measurement data electronics unit to the engine controller after the engine controller has been switched on.

6. A device for diagnosing a fuel evaporation retention system of a vehicle with an internal combustion engine, an engine controller, and a pressure and temperature sensor system, the device comprising:

a measurement data electronics unit storing measured value pairs at predetermined time intervals while the engine controller is switched off and the vehicle is at a standstill;

wherein the measured value pairs each comprise a measured pressure value and a measured temperature value; and the measurement data electronics unit transmits the measured value pairs stored while the engine controller was switched off to the engine controller after the engine controller has been switched on.

7. The device as claimed in claim 6, wherein the fuel evaporation retention system has a tank region including a fuel tank, a tank ventilation line, a pressure sensor, and a temperature sensor.

8. The device as claimed in claim 7, wherein the pressure sensor and the temperature sensor comprise a combined pressure and temperature sensor.

9. The device as claimed in claim 8, wherein the measurement data electronics unit is integrated into the housing of the combined pressure and temperature sensor.

10. The device as claimed in claim 7, wherein the measurement data electronics unit comprises an independent component.

11. The device as claimed in claim 6, further comprising a communication line connecting the measurement data electronics unit to the engine controller.

12. The device as claimed in claim 6, further comprising a voltage supply line connecting the measurement data electronics unit to a voltage source.

13. The device as claimed in claim 12, wherein the voltage source comprises a terminal of the internal combustion engine or a button cell.

14. The device as claimed in claim 6, wherein the measurement data electronics unit is configured to transmit presently determined measured pressure and temperature values to the engine controller while the engine controller is switched on.

* * * * *